United States Patent [19]
Layer et al.

[11] Patent Number: 5,931,739
[45] Date of Patent: Aug. 3, 1999

[54] FAIL-SAFE RIDE SIMULATOR

[75] Inventors: John Christian Layer, East Aurora; Gregory Joseph Guzewich, West Seneca; Larry D. Hall, East Aurora, all of N.Y.

[73] Assignee: Moog Inc., East Eurora, N.Y.

[21] Appl. No.: 08/173,764

[22] Filed: Dec. 27, 1993

[51] Int. Cl.[6] .................................................. A63G 31/04
[52] U.S. Cl. ............................... 472/60; 472/130; 434/55
[58] Field of Search ............................... 472/59, 60, 130; 434/29, 55, 58

[56] References Cited

U.S. PATENT DOCUMENTS

| | | | |
|---|---|---|---|
| 1,789,680 | 1/1931 | Gwinnett | 472/60 |
| 3,564,206 | 2/1971 | Lauck, III | 219/501 |
| 4,066,256 | 1/1978 | Trumbull | 472/60 |
| 4,478,407 | 10/1984 | Manabe | 472/60 |
| 4,682,153 | 7/1987 | Boozer et al. | 340/507 |
| 4,874,162 | 10/1989 | Trumbull et al. | 472/60 |
| 5,009,412 | 4/1991 | Roodenburg et al. | 472/59 |

*Primary Examiner*—Kien T. Nguyen
*Attorney, Agent, or Firm*—Phillips, Lytle, Hitchcock, Blaine & Huber LLP

[57] ABSTRACT

A fail-safe ride simulator (10) broadly includes a base (11), a platform (13) mounted for movement relative to the base, an actuation mechanism (14) operatively arranged between the platform and an actuation mechanism operatively arranged between the platform and the base. The actuation mechanism includes a plurality of electro-mechanical servoactuators (23) acting between the platform and base for causing relative movement therebetween. A fail-safe circuit (34) is operatively arranged to continuously monitor the condition of the actuation mechanism, and to cause the platform to move automatically toward a predetermined position relative to the base in the event of an unsafe condition in the actuation mechanism.

18 Claims, 3 Drawing Sheets

FAIL-SAFE RIDE SIMULATOR

TECHNICAL FIELD

The present invention relates generally to the field of motion simulators having a platform movable relative to a base, and, more particularly, to an improved motion simulator in which various parameters of an electro-mechanical actuating mechanism between the platform and base are continuously monitored, and the platform is automatically returned to an initial loading position in the event of a sensed failure.

BACKGROUND ART

Motion simulators are often used for the purpose of training, education, testing and entertainment. These devices include flight simulators, amusement rides and the like, and may also have application in the developing field of virtual reality.

Such motion simulators typically have a movable platform, a stationary base, and a servo-controlled articulation mechanism arranged between the platform and the base for selectively articulating the platform in a manner so as to simulate the motion of a vehicle. The perception that the passengers are in a vehicle may be further enhanced by visual and audible displays.

Depending upon the particular motion to be simulated, the platform motions may be rapid (as required), but are preferably smooth (i.e., without abrupt steps or bumps due to friction). Moreover, where human passengers are expected to ride on the platform, special demands are placed on performance and safety features. If the actuation system fails, for whatever reason, care must be taken to insure the continued safety of the passengers.

In most prior motion simulation systems, regardless of size or degrees of freedom, the actuation mechanism has typically consisted of electrohydraulic servoactuators. The state of this art has advanced markedly over the years with solutions of various performance and safety problems. For example, actuator friction problems have been substantially reduced through the use of special seals and hydrostatic bearings. End-of-stroke actuator snubbing has been implemented with piston-related flow restrictions. Pressurized accumulators have provided supplemental hydraulic energy for controlled return to the loading position. Solenoid-operated valves, controlled by electrical failure sensors, have blocked or isolated servovalves, and have selectively connected suitable bypasses across an actuator to allow for a slow "crash" and a safe "abort" condition. These features are largely carry-overs from other hydraulic applications, and are inherently available in use of fluid control.

While hydraulic servoactuators provide excellent motion control performance, they do have a number of disadvantages. These range from high maintenance due to leakage of environmentally-unfriendly and flammable fluids, to problems associated with contamination of the serviced fluid(s) and the undesired closure of small restrictive orifices, to low energy efficiency with the attendant problem of heat dissipation. In addition, a typical hydraulic system installation usually requires the costly and unnecessary construction of a separate pump room to house the pumping equipment and to contain the associated heat, noise and hazardous materials.

DISCLOSURE OF THE INVENTION

The present invention broadly provides an improved fail-safe ride simulator employing electro-mechanical servoactuators, and method of operating same.

With parenthetical reference to the corresponding parts, portions or surfaces of the disclosed embodiment, merely for purposes of illustration and not by way of limitation, the present invention broadly provides, in one aspect: an improved ride simulator (10), which broadly comprises: a base (11); a platform (13) mounted for movement relative to the base; an actuation mechanism (14) operatively arranged between the platform and base, the actuation mechanism including a plurality (i.e., two or more) of electro-mechanical servoactuators acting between the platform and base for selectively causing relative movement therebetween; and fail-safe means (34) operatively arranged to continuously monitor various parameters and conditions of the actuation mechanism and to cause the platform to move automatically toward a predetermined position, such as the initial loading position, relative to the base in the event of a sensed unsafe condition in the actuation mechanism.

In another aspect, the invention provides an improved method of operating a ride simulator (10) having a base (11), having a platform (13) mounted for movement relative to the base, and having a plurality of electro-mechanical servoactuators (16, 18 or 19) acting between the platform and base for selectively causing relative movement therebetween. The improved method broadly includes the steps of commanding the platform to move relative to the base; monitoring the response of the platform to such commanded motion; and causing the platform to move automatically toward a predetermined position relative to the base, notwithstanding such command motion, whenever the difference between the desired parameter and the monitored response exceeds a predetermined value.

In still another object, the invention provides: an improvement in a ride simulator (10) having a base (11), and having a platform (13) mounted for movement relative to the base. The improvement broadly provides an improved servoactuator (23) acting between the platform and base for selectively causing relative motion therebetween. The improved servoactuator has an electric motor (25) provided with a rotatable output shaft (26); an anti-friction screw-and-nut mechanism (28, 30) associated with the motor and operatively arranged to convert rotational movement of the motor output shaft into linear motion of an extensible and retractable actuator rod (31); a sensor (33) arranged to monitor the position of the rod; positively-lubricated bearings (76) arranged to react to axial and transverse loads developed in the servoactuator; and an electrical control servoloop closed about the motor and sensor and operative to vary the length of the rod as a function of an electrical command signal.

Accordingly, the general object of the invention is to provide an improved electro-mechanically actuated fail-safe ride simulator.

Another object is to provide an improved electro-mechanically actuated fail-safe ride simulator in which a movable platform is caused to return automatically to an initial position upon detection of a failure in the actuation mechanism.

Another object is to provide an improved method of operating such a ride simulator.

Still another object is to provide an improved electro-mechanical servoactuator for use in such a ride simulator.

These and other objects and advantages will become apparent from the foregoing and ongoing written specification, the drawings and the appended claims.

DESCRIPTION OF THE PREFERRED EMBODIMENT(S)

Figure 2:
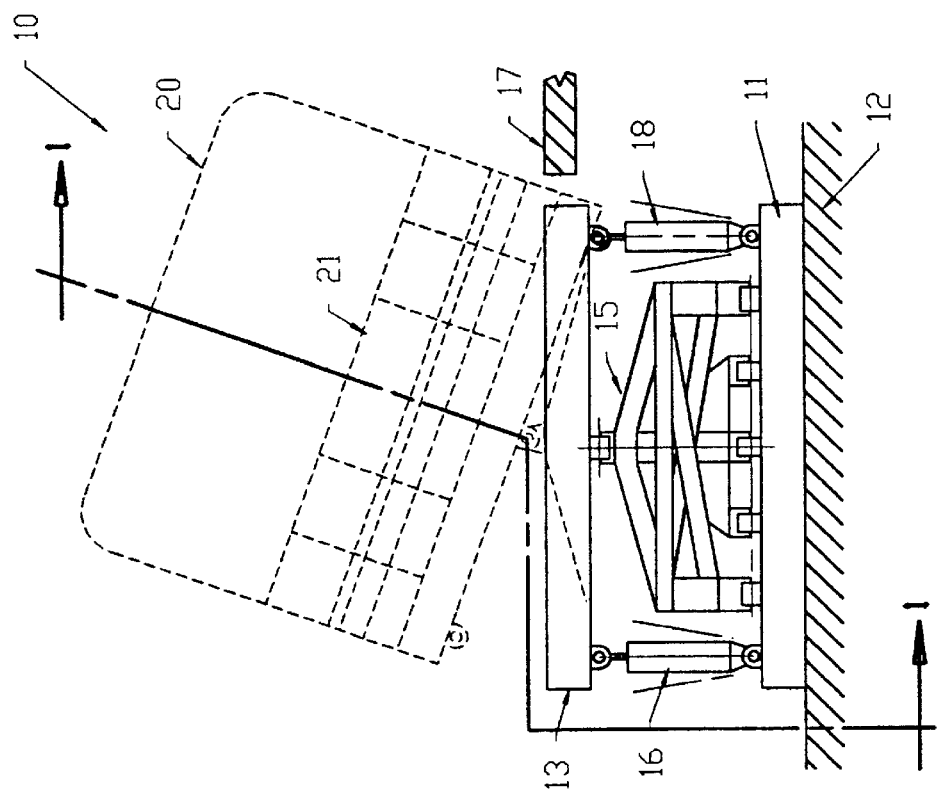
FIG. 2 is a fragmentary transverse view, partly in vertical section and partly in elevation, of the simulator shown in FIG. 1, with the people removed, this view being taken on line 2—2 of FIG. 1.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
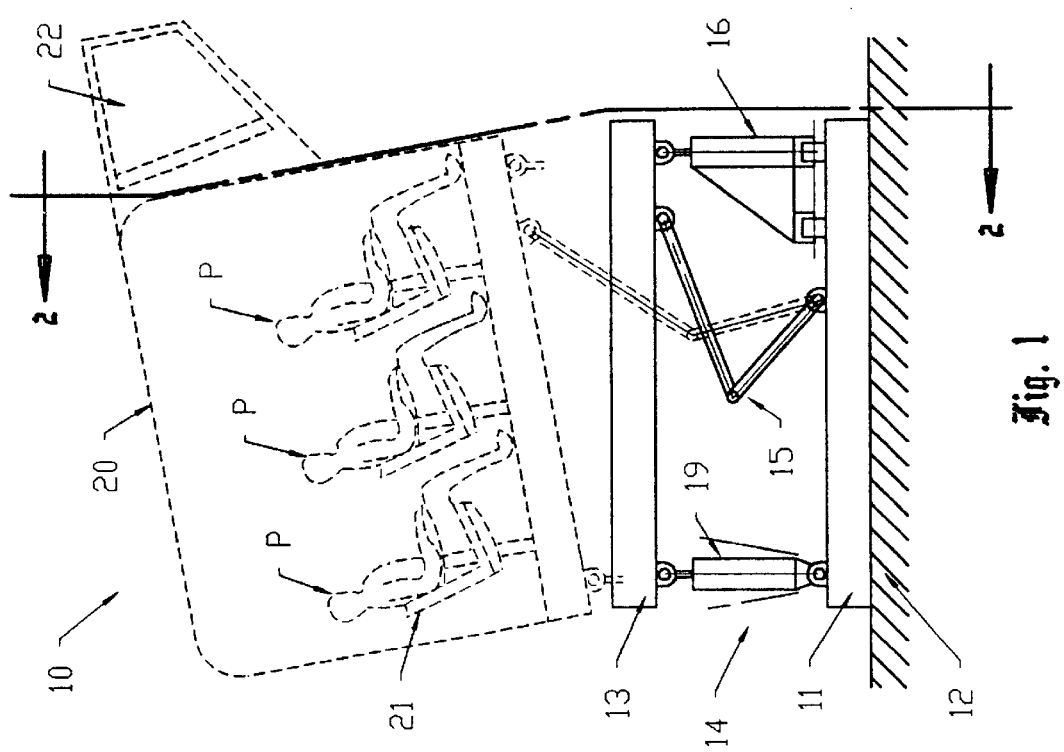
FIG. 1 is a fragmentary longitudinal view, partly in vertical section and partly in elevation, of the improved ride simulator, taken generally on line 1—1 of FIG. 2, this view showing in solid the platform, base and actuation mechanism, and also depicting in phantom an alternative raised position of the platform.

Referring now to the drawings, and, more particularly, to FIGS. 1 and 2 thereof, the present invention broadly provides an improved motion or ride simulator, of which a presently-preferred form is generally indicated at 10. Simulator 10 is shown as broadly including a rectangular plate-like base 11 which is adapted to rest on a suitable supporting surface 12; a rectangular plate-like platform 13 spaced above, and mounted for articulated movement relative to, the base; and an actuation mechanism, generally indicated at 14, operatively arranged between the platform and the base.

The actuation mechanism includes a plurality (i.e., two or more) of electro-mechanical servoactuators acting between the platform and the base causing relative motion therebetween. In the disclosed embodiment, the platform is mounted on the base via a central scissors-type linkage 15, which constrains the platform's possible motion by at least one degree of freedom. Also, in the preferred embodiment, there are three such servoactuators. Two, severally indicated at 16 and 18, respectively are mounted near the front of the simulator, and the third, indicated at 19, is mounted at the rear. These three servoactuators are shown as being arranged approximate the apices of an imaginary triangle. Moreover, clevis-type connections between the base and forward actuators 16, 18, constrain those actuators to lateral or transverse swinging motion (but not fore and aft) relative to the base about their pivotal axes. Conversely, rear actuator 19 is constrained to pivot fore and aft, but not transversely, relative to the base. In the preferred embodiment, the movable platform 13 is shown as carrying a capsule or enclosure 20 containing a number of rows of seats, severally indicated at 21, for passengers, severally indicated at P. These passengers P are arranged to face a video display 22.

In general, the platform will simulate the motion of a vehicle, although it need not necessarily do so. For example, if an entertainment or arcade-type device, the capsule may simulate the sound and interior appearance of a space craft. Alternatively, the capsule may simulate the ride of a roller coaster. The possibilities are virtually endless. Suffice it to say here that the passengers face toward a video display, and that the capsule may be provided with appropriate sounds necessary to complete the perception of the ride being duplicated. At the same time, the function of the simulator is to physically move the platform spatially in a manner choreographed to the sound and video display.

Figure 3:
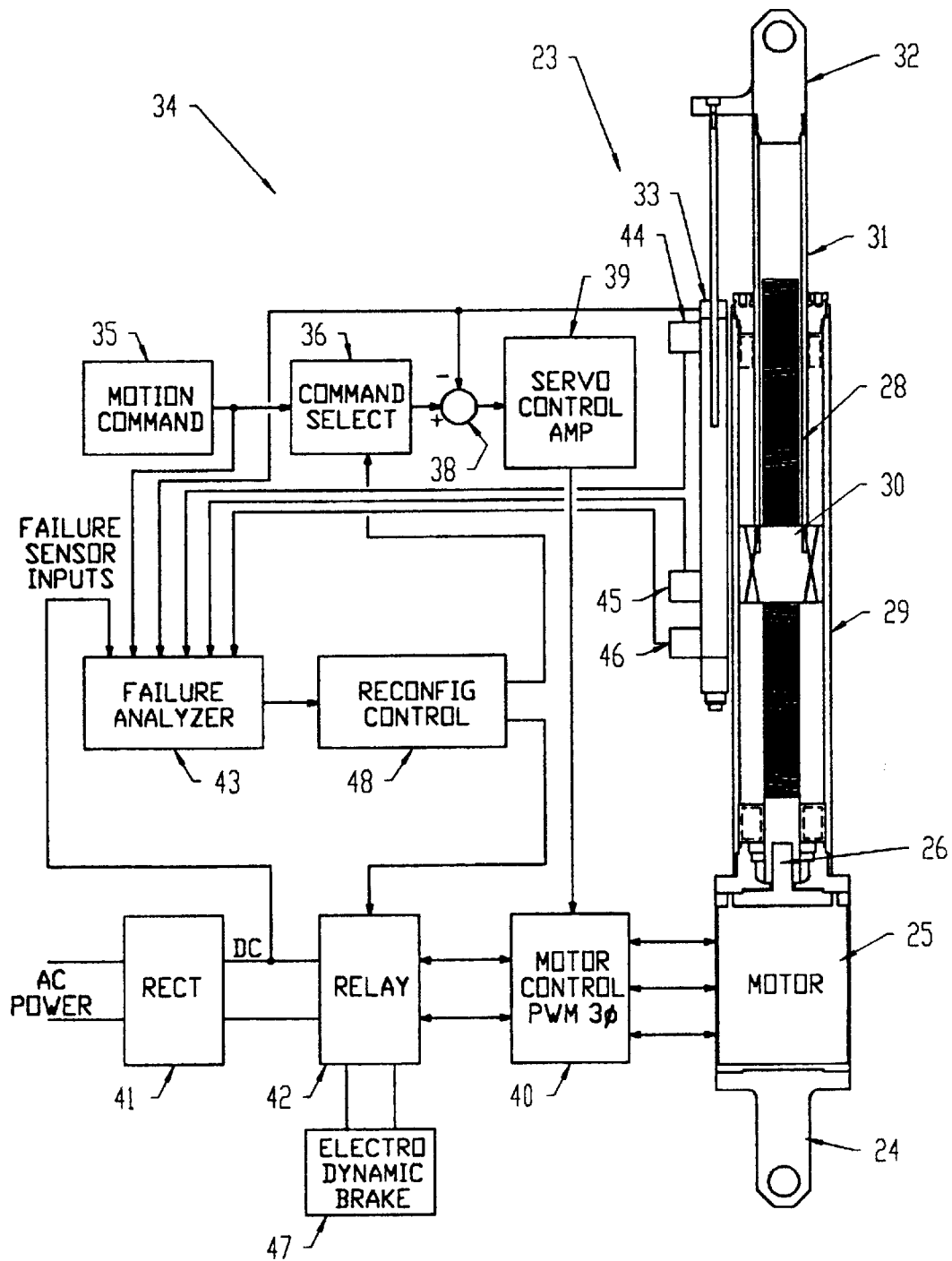
FIG. 3 is a schematic and block diagram of a servoactuator shown in FIGS. 1 and 2, this view showing the electro-mechanical servoactuator, and the fail-safe circuitry associated therewith.

FIG. 3 is a schematic view of one of the servoactuators and fail-safe means shown in FIGS. 1 and 2. In FIG. 3, the actuator, now indicated at 23, is shown as having a lower eye-type connection 24, an electric motor 25 having a rotatable output shaft 26, a screw thread 28 connected to motor output shaft 26, and an outer tube 29 having its lower end mounted on the stator portion of the motor and extending upwardly therefrom so as to surround the screw. A low-friction nut 30 is operatively arranged within tube 29 and has an internally-threaded surface matingly engaging screw thread 28. Thus, as screw 28 rotates in either angular direction, the screw thread connection with the nut will cause the nut to move linearly toward or away from the motor, as appropriate. An inner tube 31 is movable with the nut and terminates in an uppermost eye 32. A position feedback transducer 33, is operatively mounted on the actuator to monitor and determine the position of the extensible inner tube 31 relative to the stationary outer tube 29.

The fail-safe means, generally indicated at 34, is shown in block diagram form. Block 35 represents the input electrically-signalled motion command supplied to the actuator. The output of block 35 is supplied to a command selector, represented in block 36. The output of command selector 36 is supplied as a positive input to a summing point 38, which is also provided with a negative position feedback from transducer 33. Thus, summing point 38 is arranged to supply an error signal as a function of the algebraic sum of these command and feedback signals to a servocontrol amplifier 39. Amplifier 39 provides velocity control in the form of current commands to a three-phase pulse-width-modulated motor controller, represented in block 40. A.C. power from a suitable source is provided to a rectifier 41. The d.c. output of rectifier 41 is provided through a relay 42 as a power input to motor controller 40.

A failure analyzer 43, in the nature of a computer, is provided with a number of inputs. Analyzer 43 receives a d.c. power input signal from the rectifier output. It also receives a motion command input from block 35. It also receives an actual position feedback signal from transducer 33. Moreover, limit switches 44, 45 and 46 are mounted on the transducer to determine whether the nut has exceeded its permissible range of travel. It should be noted, that these limit switches are independent of the operation of transducer 33. In any event, the outputs of limit switches 44, 45 and 46 are provided as inputs to failure analyzer 43. Analyzer 43 compares the commanded and actual positions of the actuator to insure that they are within operational tolerances. Similarly, the analyzer also verifies, via the inputs from switches 44, 45 and 46, that the nut is within its permissible range of travel.

The failure analyzer produces an output signal to a reconfiguration controller, represented in block 48. This controller provides an output signal to relay 42 and also provides an output signal to command selector 36. If the failure analyzer senses the absence of supplied power from rectifier 41, it causes the reconfiguration controller to connect the motor to an electro-dynamic brake load 47 so that the platform, if elevated, will be regeneratively braked as the platform weight backdrives the actuator and it moves downwardly and back toward its initial loading position adjacent dock 17. Similarly, if the failure analyzer senses that the commanded and actual positions differ by more than a predetermined amount, or that the actuator has exceeded its permissible range of travel it will cause the reconfiguration controller to remove power from the motor control and connect the electro-dynamic brake load, which results in the same safe return to the loading position.

Alternatively, if the motion command exceeds the permissible range of travel, or if the command rate exceeds predetermined limits, then command selector 36 isolates motion commands 35, and automatically substitutes a preprogrammed return-to-loading position command therefor. In other words, in this latter event, the command selector overrides the input motion commands, and separately commands the platform to return to its initial position adjacent a loading dock.

The actuators must be prevented from crashing into their full-stroke limit stops, both to prevent sudden decelerations of the platform which could injure riders, and to prevent damage to the actuator itself. The electrodynamic braking, which is introduced by the fail-safe system, will limit the actuator velocity, but a further deceleration is necessary close to the end of the actuator stroke. This may be accomplished by means of separate shock absorbers or snubbers mounted on the support structure so that they will be contacted by the platform near the extreme limits of its motion. However, the snubbing action is more conveniently and effectively incorporated directly into the actuator assembly itself. This has typically been done with hydraulic actuators by introducing a restriction into the cylinder flow path near the end of the piston stroke. In an electro-mechanical actuator, advantage may be taken of the cylindrical housing as a fluid container to create a hybrid device which incorporates hydraulic snubbing. Such a novel arrangement is shown in FIG. 4.

Figure 4:
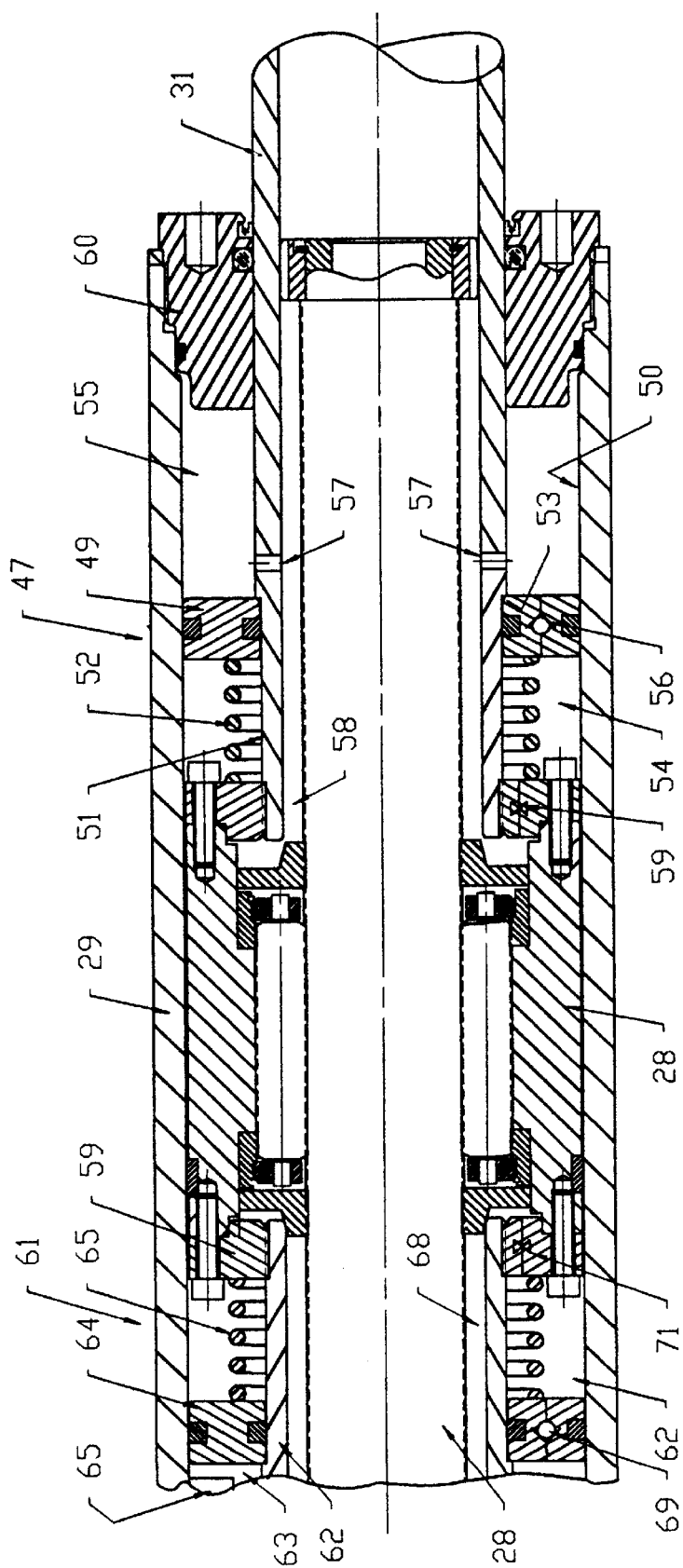
FIG. 4 is a fragmentary longitudinal vertical sectional view of a portion of the servoactuator, this view showing the snubbing chambers mounted on either side of the nut to cushion or decelerate the nut at the end of its stroke.

FIG. 4 is a longitudinal view, partly in vertical section and partly in elevation, of the portion of tube 29 surrounding nut 30, and further shows the left and right end-of-stroke snubbing mechanisms 47, 61 associated therewith. The nut 30 is shown as including grooved planetary rollers which engage multiple lead threads on the screw 28 and mating grooves on the inside of the nut housing, forming a conventional roller nut and screw arrangement. The screw and nut are lubricated by oil which completely fills the outer tube 29 and is contained by a seal on the output rod and another on the motor shaft (not shown). The presence of this fluid facilitates the use of the integral hydraulic snubbers 47, 61.

In FIG. 4, the left marginal end portion of inner tube 31 is shown as having a stepped configuration. An annular member 49, having outer and inner seals which sealingly engage the outer tube inner cylindrical surface 50 and the inner tube outer cylindrical surface 51, respectively, is biased by spring 52 to move rightwardly so as to abut a leftwardly-facing annular vertical surface 53 on the inner tube. The chamber 54 in which spring 52 is mounted, contains hydraulic fluid, as does the chamber 55 to the right of member 49. Chamber 55 communicates with chamber 54 via a one-way check valve 56 provided through member 49. Chamber 54 communicates with a chamber 58 surrounding the screw thread 28 by means of a passageway having a restricted orifice 59. Chambers 55 and 58 communicate with one another via radial holes 57. Thus, when the nut moves rightwardly within outer tube 29, piston 49 will abut an end face of bearing 60 as the nut approaches the end of its stroke. Such motion will cause piston 49 to move leftwardly relative to the inner tube off surface 53, thereby increasing the pressure in chamber 54 to produce a force to decelerate the actuator. Hence, fluid will flow from chamber 54 to chamber 58 through restricted orifice 59. Thus, this provides end-of-stroke snubbing for such rightward motion of the nut.

A similar snubber assembly, generally indicated at 61, is mounted on the left side of the nut. This snubber assembly includes a sleeve 62 surrounding the screw thread and mounted on the nut via a block 59, and a movable piston 64 analogous to piston 49. Member 64 sealingly engages the outer tube inner surface 50, and the outer surface of inner tube 62. A spring 65 is operatively arranged in a chamber 62 defined between members 59, 64, 29 and 62. Chamber 62 communicates with the annular chamber 68 surrounding the screw thread via a one-way check valve 69, and a passageway having a restricted orifice 71. Thus, when the nut moves leftwardly relative to the tube, and abuts a solid surface (not shown) at the end of its stroke, piston 64 will be displaced rightwardly off surface 70 relative to inner tube 62. This will increase the pressure in chamber 66, and will cause fluid to flow through restricted orifice 71 as described above, thereby providing a snubbing action for such movement.

Therefore, the present invention broadly provides an improved ride simulator, and method of operating same. The improved simulator has a base, a platform mounted for movement relative to the base, and an actuation mechanism for selectively causing such relative movement. The simulator also has fail-safe means which are operatively arranged to cause the platform to return to an initial loading position in the event of a sensed failure.

Modifications

The present invention contemplates that many changes and modifications may be made. For example, the base need not necessarily be in the particular form shown. Similarly, the platform need not be in the particular form shown. Also, the actuation means may assume forms other than that specifically shown, and the central scissors-type linkage may be omitted altogether if other motion constraints are provided. The actuation mechanism may have more than three servoactuators, and the platform is not necessarily limited to roll, pitch and heave motions. Similarly, the capsule, enclosure or other object mounted on the platform may be changed as desired. The platform may carry animate or inanimate objects, depending upon the particular application. The fail-safe means may be readily changed or modified as desired as indicated, the screw thread of the screw-and-nut mechanism may be surrounded by lubricant, or may be positively lubricated at the end of the stroke.

Therefore, while the preferred embodiment of the invention has been shown and described, and several modifications thereof discussed, persons skilled in this art will readily appreciate that various additional changes and modifications may be made without departing from the spirit of the invention, as defined and differentiated by the following claims.

What is claimed is:

1. A ride simulator, comprising:

a base;

a platform mounted for movement relative to said base;

an actuation mechanism operatively arranged between said platform and base, said actuation mechanism including a plurality of electro-mechanical servoactuators acting between said platform and said base for selectively causing relative movement therebetween; and fail-safe means operatively arranged to continuously monitor the condition of said actuation mechanism and to cause said platform to move automatically toward a predetermined position relative to said base in the event of any unsafe and uncontrolled condition of said actuation mechanism resulting in (a) exceeding a predetermined disparity between commanded and actual positions, (b) exceeding a predetermined range of travel, (c) applying a command that exceeds a permissible range of travel, or (d) applying a command rate that exceeds predetermined limits.

2. A ride simulator as set forth in claim 1 wherein said actuation means further includes a linkage arranged to limit at least one degree of freedom of the motion of said platform relative to said base.

3. A ride simulator asset forth in claim 1 wherein said fail-safe means includes a sensor arranged to continuously monitor a parameter of one of said servoactuators and to indicate a failure of such sensed parameter.

4. A ride simulator as set forth in claim 3 wherein said sensor is arranged to monitor the actual motion of said platform as a function of time, to compare such monitored motion with a desired motion, and to indicate a failure when said actual and desired motions differ by more than a predetermined amount.

5. A ride simulator as set forth in claim 4 wherein said sensor is arranged to cause said servoactuator to move toward said predetermined position when said actual and predetermined motions differ by more than said predetermined amount.

6. A ride simulator as set forth in claim 3 wherein said sensor is arranged to monitor the actual position of said platform, to compare such sensed position with a commanded position, and to indicate a failure when said actual and commanded positions differ by a predetermined amount.

7. A ride simulator as set forth in claim 6 wherein said sensor is arranged to cause said servoactuator to be commanded to move toward said predetermined position when said actual and commanded positions differ by more than said predetermined amount.

8. A ride simulator as set forth in claim 3 wherein said sensor is arranged to monitor whether said actuator has exceeded a limit of its permissible stroke, and to indicate a failure whenever said actuator has exceeded such stroke limit.

9. A ride simulator as set forth in claim 3 wherein said sensor is arranged to sense a loss of power to said servoactuator.

10. A ride simulator as set forth in claim 3 wherein said sensor is arranged to cause said servoactuator to be caused to move toward said predetermined position in the event of a sensed failure.

11. A ride simulator as set forth in claim 3 wherein said sensor is arranged to cause said servoactuator to be connected to a regenerative brake in the event of a sensed loss of power.

12. A ride simulator as set forth in claim 1 wherein said servoactuator includes shock absorber means operatively arranged within said actuator to snub the relative motion between said platform and base as said servoactuator approaches a limit of its permissible stroke.

13. A ride simulator as set forth in claim 12 wherein said shock absorber means is hydraulic.

14. A ride simulator as set forth in claim 13 wherein said shock absorber means includes a piston mounted for sealed sliding movement within a fluid-filled cylindrical housing, and wherein an actuator output rod has one end connected to said piston and has an intermediate portion sealingly penetrating said housing.

15. A ride simulator as set forth in claim 14 wherein the fluid contained between said piston and said housing is forced to flow through a fluid restriction when said actuator rod moves beyond a predetermined position as it approaches an end of its maximum permissible stroke.

16. The method of operating a ride simulator having a base, having a platform mounted for movement relative to said base, and having a plurality of electro-mechanical servoactuators acting between said platform and base for selectively causing relative movement therebetween, comprising the steps of:

commanding said platform to move relative to said base;

monitoring at least one performance parameter of said servoactuators;

monitoring the response of said platform to such commanded motion; and causing said platform to move automatically toward a predetermined position relative to said base, notwithstanding such commanded motion, whenever (a) said servoactuators exceed a predetermined disparity between commanded and actual positions, (b) said servoactuators exceed a predetermined range of travel, (c) a command is applied that exceeds a permissible range of travel, or (d) a command rate is applied that exceeds predetermined limits.

17. A ride simulator, comprising:

a base;

a platform mounted for movement relative to said base;

an actuation mechanism operatively arranged between said platform and base, said actuation mechanism including a plurality of electro-mechanical servoactuators acting between said platform and said base for selectively causing relative movement therebetween; and fail-safe means operatively arranged to continuously monitor the condition of said actuation mechanism and to cause said platform to move automatically toward a predetermined position relative to said base in the event of any unsafe and uncontrolled condition of said actuation mechanism resulting in (a) exceeding a predetermined disparity between commanded and actual positions, or (b) exceeding a predetermined range of travel.

18. The method of operating a ride simulator having a base, having a platform mounted for movement relative to said base, and having a plurality of electro-mechanical servoactuators acting between said platform and base for selectively causing relative movement therebetween, comprising the steps of:

commanding said platform to move relative to said base;

monitoring at least one performance parameter of said servoactuators;

monitoring the response of said platform to such commanded motion; and causing said platform to move automatically toward a predetermined position relative to said base, notwithstanding such commanded motion, whenever (a) said servoactuators exceed a predetermined disparity between commanded and actual positions, or (b) said servoactuators exceed a predetermined range of travel.

* * * * *